(12) United States Patent
Backhouse (10) Patent No.: US 6,318,970 B1
(45) Date of Patent: *Nov. 20, 2001

(54) FLUIDIC DEVICES

(75) Inventor: Chris J. Backhouse, Edmonton (CA)

(73) Assignee: Micralyne Inc., Edmonton (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,865

(22) Filed: Mar. 12, 1998

(51) Int. Cl.$^7$ .............................. H02K 44/00; F04F 11/00
(52) U.S. Cl. ................................................ 417/92; 417/50
(58) Field of Search .................... 417/50, 92, 65, 417/48, 68, 322; 210/222, 223

(56) References Cited

U.S. PATENT DOCUMENTS

| | | | |
|---|---|---|---|
| 3,906,415 | * | 9/1975 | Baker ........................................ 335/47 |
| 4,050,851 | | 9/1977 | Haavik .................................... 417/68 |
| 4,445,696 | | 5/1984 | Raj et al. .................................. 277/80 |
| 4,579,173 | * | 4/1986 | Rosensweig et al. ................. 166/248 |
| 4,808,079 | * | 2/1989 | Crowley ................................... 417/50 |
| 5,005,639 | | 4/1991 | Leland ............................. 165/104.25 |
| 5,213,479 | | 5/1993 | Dardis et al. ........................... 417/68 |

(List continued on next page.)

FOREIGN PATENT DOCUMENTS 2140128   11/1984   (GB) ............................. F16K/31/06

OTHER PUBLICATIONS

Development of an Electromagnetically Actuated Mercury Microvalve, Douglas R. Adkins and C. Channy Wong, DSC—vol. 66, Micro–Electro–Mechanical Systems (MEMS)—1998 (ASME 1998), pp. 133–137.

Microactuation by Continuous Electrowetting Phenomenon and Silicon Deep Rie Process, Junghoon Lee and Chang–Jin "CJ" Kim, DSC—vol. 66, Micro–Electro–Mechanical Systems (MEMS)—1998 (ASME 1998), pp. 475–480.

Study of MHD (Magnetohydrodynamic) Micropump, Kazuo Hosokawa, Isao Shimoyama and Hirohumi Miura, Paper No. 92–0446, 1993, pp. 205–210, with attached translation (8 pages).

Magnetic Fluids: Magnetic Forces and Pumping Mechanisms, Constance Warren Miller, Jan. 1974, p. 1 (pp. 91–109 of this reference were previously disclosed).

LookSmart computer search for "ferrofluid" indicating The Design of a Ferrofluid Magnetic Pipette, Sep. 3, 1998, 3 pages.

A Survey of Ferromagnetic Liquid Applications, M.P. Perry, p. 219–230, Thermomechanics of Magnetic Fluids, Theory and Applications, Edited by B. Berkovsky, Science Sector,

(List continued on next page.)

*Primary Examiner*—Henry C. Yuen
*Assistant Examiner*—Mahmoud M. Gimie
(74) *Attorney, Agent, or Firm*—Christensen O'Connor Johnson Kindness PLLC (57) ABSTRACT

A microfluidic device operates as a pump for pumping fluid along a channel in a microchip by moving a drive fluid in the channel under the influence of a force field that is generated externally to the channel. The drive fluid is preferably a ferrofluid, and the force field is preferably a variable magnetic field. Drive fluid, driven by variation of the magnetic field, drives driven fluid through the channel. The drive fluid is recirculated, in one case by rotating the drive fluid within an enlargement in the channel, and in another case by returning the drive fluid along a return channel. A valve is formed by using a ferrofluid plug as a movable barrier for fluids in a channel. The microfluid device may be formed between two plates forming a microchip. The channels may be as small as 1 μm to 100 μm. Methods of pumping fluids by using an in channel drive fluid and exterior drive are also disclosed.

6 Claims, 13 Drawing Sheets

U.S. PATENT DOCUMENTS 5,541,072 * 7/1996 Wang et al. .......................... 435/7.21
5,622,831 * 4/1997 Liberti et al. ....................... 435/7.21

OTHER PUBLICATIONS

UNESCO, Proceedings of the International Advanced Course and Workshop on Thermomechanics of Magnetic Fluids Organized by the International Centre for Mechanical Sciences,cited reference to "Magnetic Fluids: Magnetic Forces and Pumping Mechanisms", C.W. Miller, Sibley School of Mechanical and Aerospace Engineering, Cornell University, Ithica, New york, Final Technical Report, Sep. 1973.

The Design of a Ferrofluid–Magnetic Pipet by Nancy E. Greivell, Jun. 1995, cover page and p. 3–5 and 21–56.

Magnetic Fluids, Magnetic Forces and Pumping Mechanisms, by Constance Warren Miller, Jan. 1974, cover page and p. 91–109.

* cited by examiner

FLUIDIC DEVICES

FIELD OF THE INVENTION

This invention relates to fluidic devices, and particularly microfluidic devices.

BACKGROUND OF THE INVENTION

Microfluidic devices are becoming increasingly critical to biochemical analysis. These devices may have channels whose cross-sections are in the order of 1 µm to 1000 µm A fluid containing a sample to be analyzed and a reagent for activating the sample are delivered along channels to a reaction zone in the microchip. Pumping of the fluid is often carried out with external pumps, or electrical pumps that rely upon principles such as electroosmosis, electrophoresis and dielectrophoresis. When external pumps are used, problems can arise in both sample and reagent delivery.

For example, in sample delivery, transfer of sample to the chip may result in pressure differentials in excess of the pumping capacity, with resulting pressure fluctuations. In reagent delivery, the channels in the chip must be manually primed with reagent, with risk of cross-contamination.

SUMMARY OF THE INVENTION

There is thus a need for an on chip pump for use with microchips.

The invention provides a device that provides isolation and sample delivery in a microchip while not introducing large dead volumes. In addition, the use of the micropump in the channel allows pre-priming of the microchip, thus reducing the time in which the microchip is exposed to contaminants.

According to a first aspect of the invention, a pump pumps fluid along a channel by moving a drive fluid in the channel under the influence of a force field that is generated externally to the channel. The drive fluid is preferably a ferrofluid, and the force field is preferably a variable magnetic field. Drive fluid, driven by variation of the magnetic field, drives driven fluid through the channel. The drive fluid is recirculated, in one case by rotating the drive fluid within an enlargement in the channel, and in another case by returning the drive fluid along a return channel. The channel is preferably a microchannel in a microchip. The channel and pump may be formed between two plates forming a microchip. The channel may be as small as 1 µm to 100 µm in its cross-sectional dimensions. A valve is formed by using a ferrofluid plug as a movable barrier for fluids in a channel. Methods of pumping fluids by using an in channel drive fluid and exterior drive are also disclosed.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figures 1, 1A:
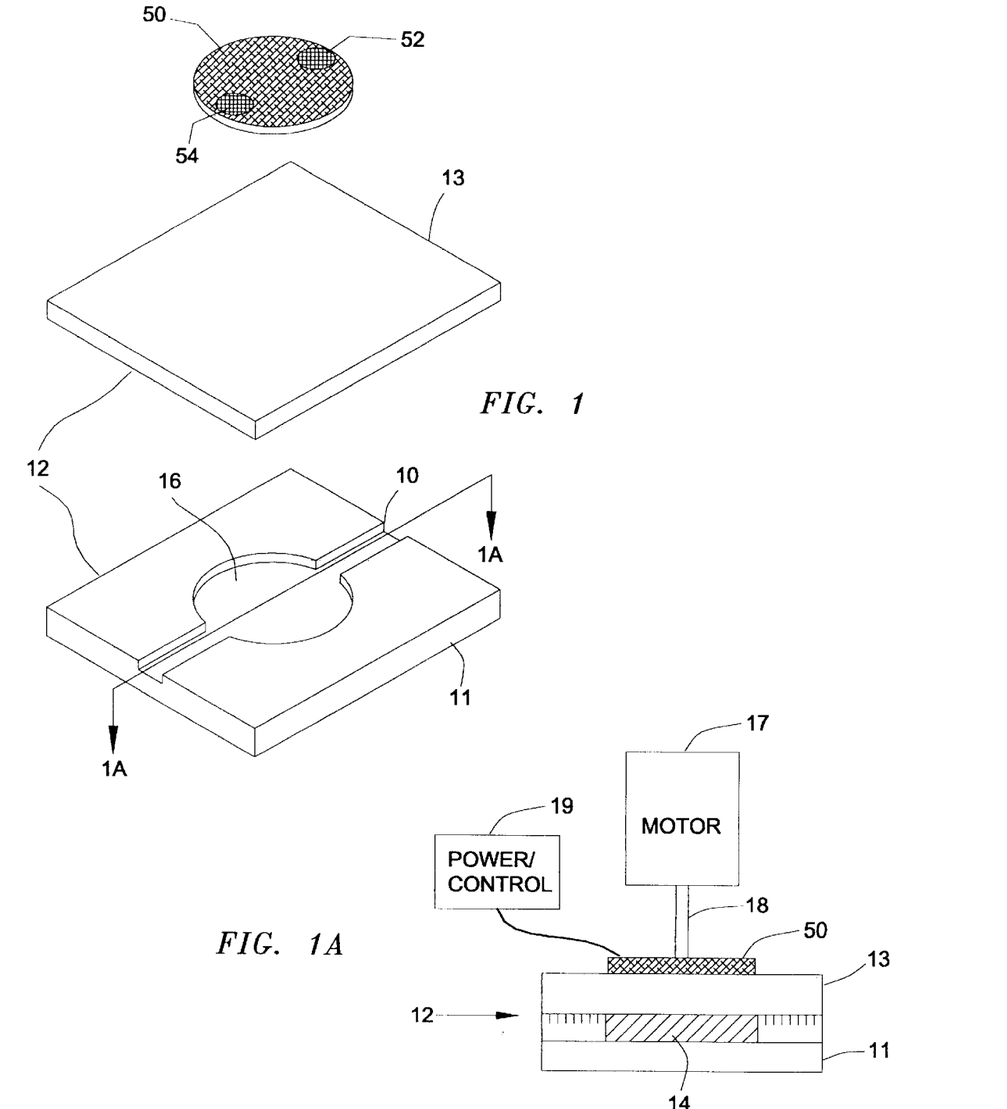
FIG. 1 is an exploded view showing a first embodiment of the invention.
FIG. 1A is a section through the embodiment of FIG. 1 along the line 1A—1A.
Figure 2:
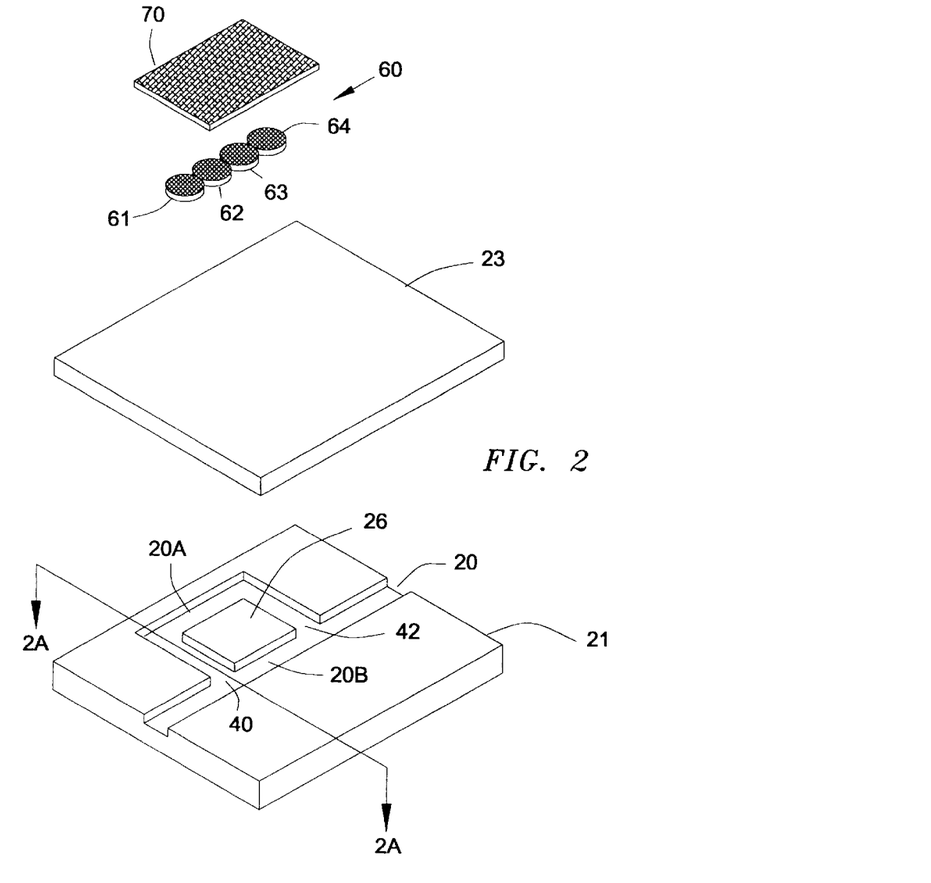
FIG. 2 is an exploded view showing a second embodiment of the invention.
Figure 2A:
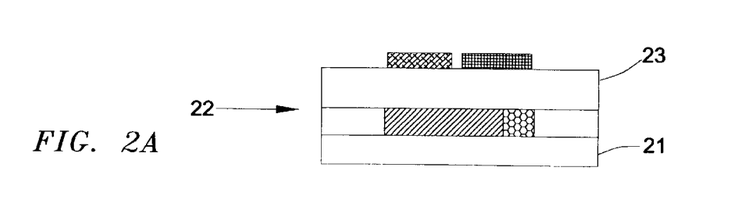
FIG. 2A is a section through the embodiment of FIG. 2 along the line 2A—2A.

Referring to FIG. 1, a channel 10 extends through a body 12 and may be formed such as by etching or laser ablating the channel in a base plate 11 and covering 10 the base plate 11 with a cover plate or lid 13. The channel 10 may have cross-sectional dimensions in the order of 1 µm to 1000 µm, preferably in the range 1 µm to 100 µm. Such devices are known as microchips, and conventional micromachining methods may be used to make the channels. The channel 10 may be straight, but it is preferred to form a reservoir in the channel 10 for a drive fluid plug 14 such as by forming a cylindrical enlargement 16 as in FIG. 1. In another preferred embodiment, a channel 20 in body 22 formed of base 21 and lid 23 may be split into two branch channels 20A and 20B separated by a wall 26 as shown in FIG. 2. In a further embodiment shown in FIG. 3, the wall 26 may have passages 27A–27D connecting the channel branches 20A and 20B in several places.

Referring as well to FIGS. 4A–4C and 5A–5D, a drive fluid plug 14 or 24 occupies the enlargement 16 or channel 20B respectively. The drive fluid plug 14 has interfaces 14A, 14B with driven fluid in respective spaced apart portions 30, 32 of the channel 10. The drive fluid plug 24 has interfaces 24A, 24B with driven fluid in respective spaced apart portions 40, 42 of the channel 20. The portions 30, 32 of channel 10 and 40, 42 of channel 20 are spaced sufficiently to form an adequate stroke for the pump, such as 1 cm.

The drive fluid may be any fluid that is capable of being moved by forces applied by a drive exterior to the channel. For example, the drive fluid is preferably a ferrofluid. A ferrofluid is any fluid that is capable of being moved around under the influence of a magnetic field. When the drive fluid is a ferrofluid, the body 12 should be made of a nonmagnetic material at least in areas adjacent to the enlargement 16 or branch channels 20A and 20B.

Drives 50, 60 for the drive fluid are mounted exterior to the channels 10, 20 respectively. The drives 50, 60 may be attached such as by clamps to the bodies 12, 22, or each may be held in a separate frame. The drives 50, 60 should be close enough to the bodies 12, 22 that the force field may drive the drive fluid. The drives 50, 60 are configured to isolate a driven fluid segment from the portions 30, 40 respectively of the channels 10, 20 and drive the driven fluid segment to the portions 32, 42 of the channels 10, 20. When the drive fluid is a ferrofluid, the drives 50, 60 are magnetic field generators such as electromagnets.

In the example shown in FIG. 1, the drive 50 is a rotatable magnet or electromagnet with an initially weakly magnetized area 52 and an initially more strongly magnetized area 54, the remainder of the magnet being moderately magnetized. The drive 50 may be mounted on a shaft 18 of a conventional stepper motor 17. Power and control for the electromagnetic areas 52 and 54 may be supplied by a power control module 19.

Figure 4A:
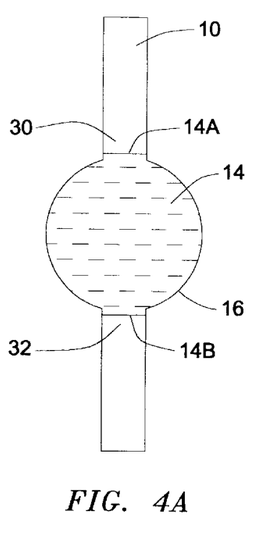
FIGS. 4A–4C show the manner of operation of the first embodiment of the invention.
Figure 4B:
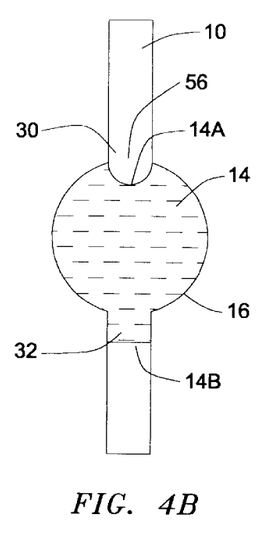
Figure 4C:
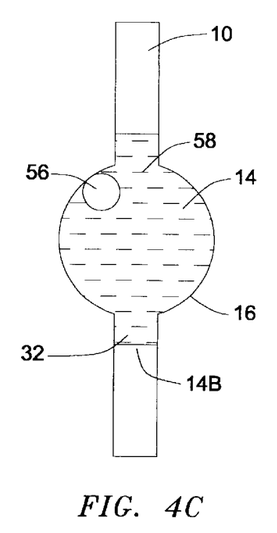

To facilitate the variability of the magnetization of the areas 52 and 54, it is preferably that they be elecromagnets. When the magnet 50 is located over the cylindrical enlargement 16 in the channel 10 with the weakly magnetized area adjacent the portion 30 of the channel 10, drive fluid is pulled away from the weakly magnetized area to alter the interface 14A and form a pocket in the drive fluid as shown in FIG. 4B. Driven fluid enters the pocket from the channel 10. The driven fluid segment 56 in the pocket is isolated from the driven fluid in the portion 30 of the channel 10 as shown in FIG. 4C with a drive fluid barrier 58 between the driven fluid segment 56 and driven fluid in the portion 30 of the channel 10. When the magnet 50 is rotated, the drive fluid barrier 58 rotates with the magnet 50 and along with the fluid in the grip of the magnet 50 drives the driven fluid segment 56 around the cylindrical enlargement 16 from the portion 30 of the channel 10 to the portion 32 of the channel 10. The weakly magnetized area is then magnetized to release the driven fluid segment 56 into the portion 32 of the channel 10. Preferably, when the pocket is formed, the area 54 is energized to draw fluid towards that end of the magnet. When the pocket is released, the strongly magnetized area 54 is preferably deenergized, weakening the field, to allow drive fluid to flow towards the pocket and drive the driven fluid into the channel 10 at area 32. As the magnet 50 continues to rotate, the area 54, which is strongly magnetized during the initial part of the rotation (first 180° of rotation), is made weak, thus forming a pocket that is occupied by a driven fluid segment from portion 30 of the channel 10. Similarly, area 52 is strengthened, thus attracting the drive fluid towards the end 32. The magnet 50 may then be continuously rotated to form a flow of driven fluid along the channel, with the degree of magnetization of areas 52 and 54 switching after each half rotation.

In the example shown in FIG. 2, the drive 60 includes a permanent magnetic strip 70 which is placed exterior to the body 22 over the channel 20A and individual magnets 61–64 over the channel 20B. This magnetic strip 70 holds the driven fluid in the channel 20A. A series of electromagnets 61–64 are placed exterior to the body 22 between the portions 40 and 42 of the channel 20B. The operation of the pump shown in FIG. 2 may then be understood from the explanation that follows and FIGS. 5A–5C.

Figure 5A:
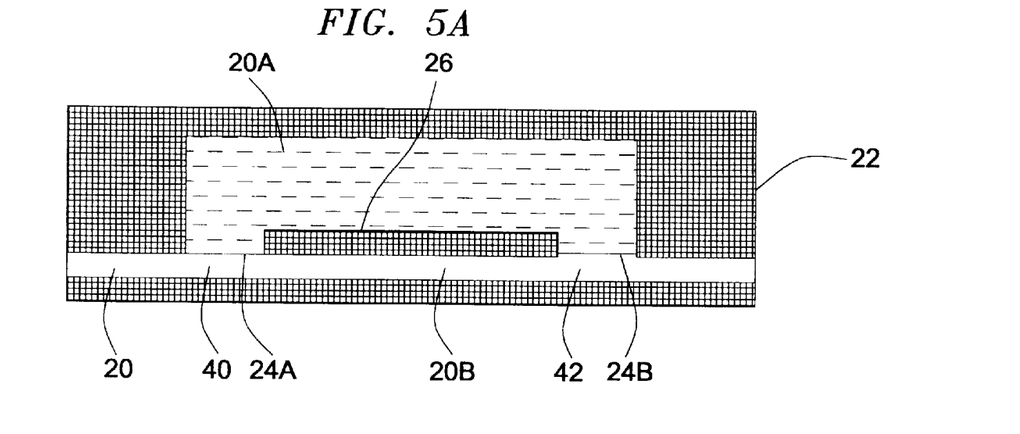
FIGS. 5D–5C show the manner of operation of the second embodiment of the invention.
Figure 5B:
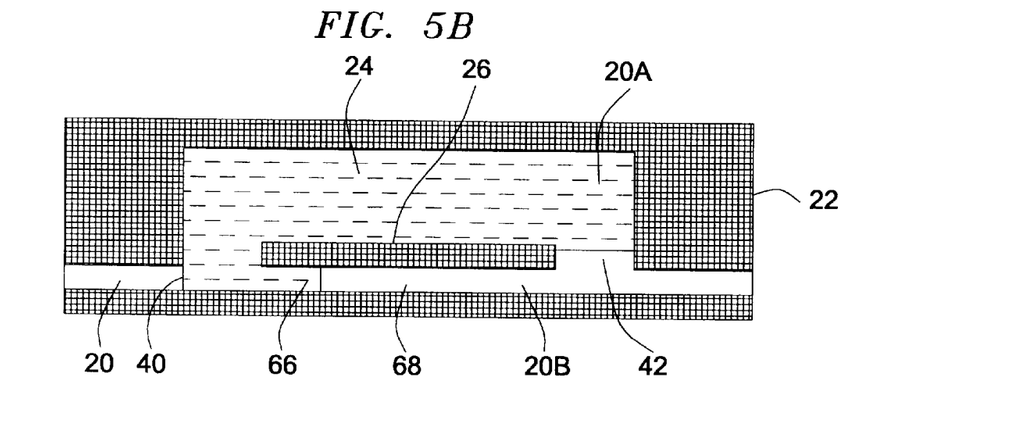
Figure 5C:
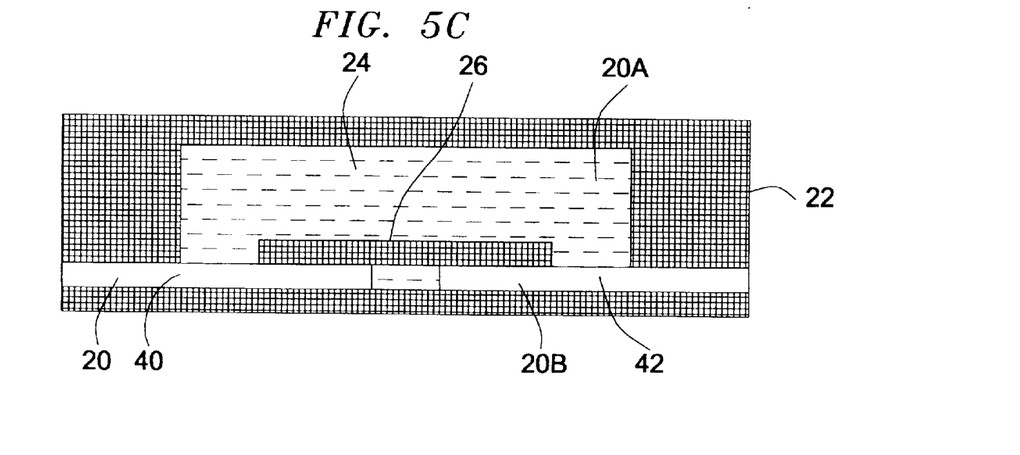

In FIG. 5A, the electromagnet 61 is strengthened, and the other electromagnets weakened to pull drive fluid into the channel 20B and form a drive fluid barrier 66 in the channel, which isolates a driven fluid segment 68 from drive fluid in the portion 40 of the channel 20B. The electromagnets 61–64 are then strengthened sequentially so that a localized strong magnetic field moves along the channel 20B from the portion 40 to the portion 42 of the channel 20B. This localized strong magnetic field drives the drive fluid barrier 66 along the channel 20B, separating it from the main drive fluid reservoir in the channel 20A. As the electromagnets 61–64 are successively strengthened, the drive fluid barrier 66 reaches the end of the pump stroke and returns to the drive fluid reservoir in channel 20A at the interface 24B. As the series of electromagnets 61–64 are repeatedly strengthened in succession, a flow of driven fluid is formed along the channel.

Figure 3:
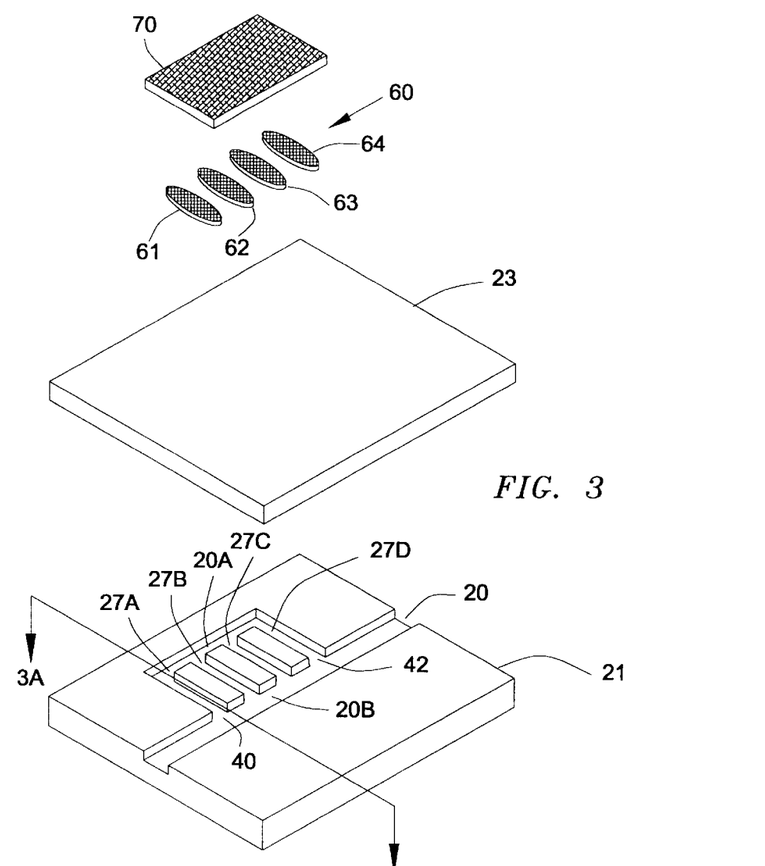
FIG. 3 is an exploded view showing a third embodiment of the invention.
Figure 3A:
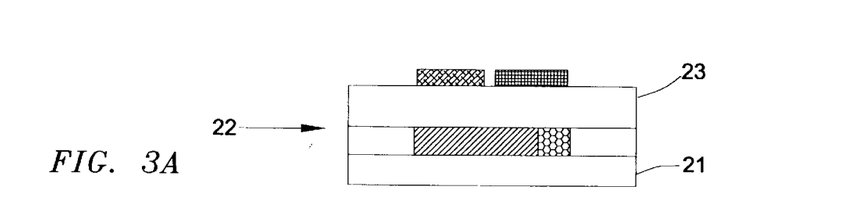
FIG. 3A is a section through the embodiment of FIG. 3 along the line 3A—3A.
Figure 6A:
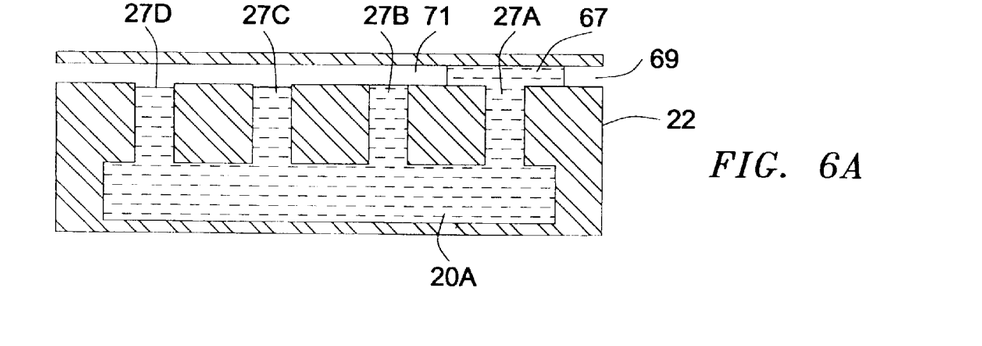
FIGS. 6A–6D show the manner of operation of the third embodiment of the invention.
Figure 6B:
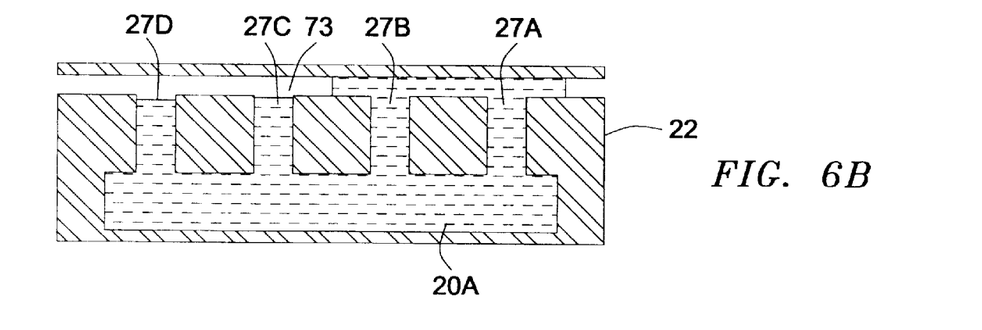
Figure 6C:
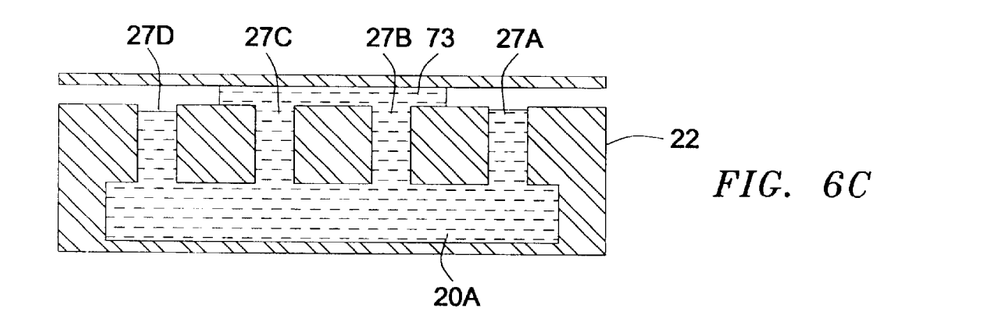
Figure 6D:
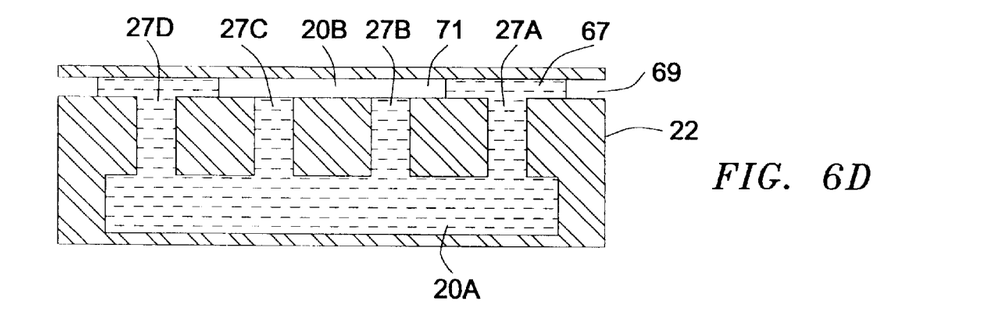

In the embodiment of the invention shown in FIGS. 6A–6D, instead of moving the drive fluid plug along the channel 20B, the drive fluid is brought out from the cross-channels 27A–27B and returned to the drive fluid reservoir through the same channel. Referring to FIGS. 3 and 6A, magnet 61 is energized to force drive fluid into the channel 20B at portion 67 through channel 27A. This forms a barrier between drive fluid in the channel at 69 and 71, and drives some fluid along the channel towards cross-channel 27B. Instead of moving the drive fluid along the channel from portion 67, the magnet 62 is energized to force fluid along channel 27B into the portion 71. This displaces driven fluid further along the channel. The process is repeated for channel 27C. Magnet 63 is energized to force fluid into channel 20B at location 73. At the same time, magnet 61 is deenergized, and fluid in portion 67 is returned by attraction of the magnetic strip 70 to the drive fluid reservoir. This process is repeated for magnet 64, which is energized while magnet 62 is deenergized, as shown in FIGS. 6C and 6D. Finally, the process is repeated again by energizing magnet 61. The effect of moving the drive fluid from channel 20A into channel 20B through cross-channels 27A–27D in succession is to drive driven fluid along the channel 20B.

In the embodiments shown in FIGS. 2 and 3, filters may be provided in the return path (eg channel 27D in FIG. 3) to prevent driven fluid from mixing with the drive fluid, to enhance stability of the colloidal suspension or to remove any contamination of the drive fluid with the driven fluid.

The drive fluid is preferably immiscible in the driven fluid. A range of immiscible ferrofluids are available commercially available, as for example from Ferrofluidics Inc. of Nashua, N.H. USA. If ferrofluids are used, they should not have ferromagnetic particles larger than the channel size. Ferrofluids available from Ferrofluidics Inc. can withstand 1 atmosphere pressure differential, which is adequate for the intended application. Ferrofluids are colloidal suspensions of ultramicroscopic magnetic particles in a carrier liquid, usually used as lubricants or damping fluids. If the ferrofluid is not immiscible in the driven fluid, then some means must be used to maintain the ferromagnetic particles in a stable colloidal suspension.

The drive fluid may also be a dielectric fluid, and the drive is then provided by a strong electric field, preferably oscillating at high frequency.

Figure 7A:
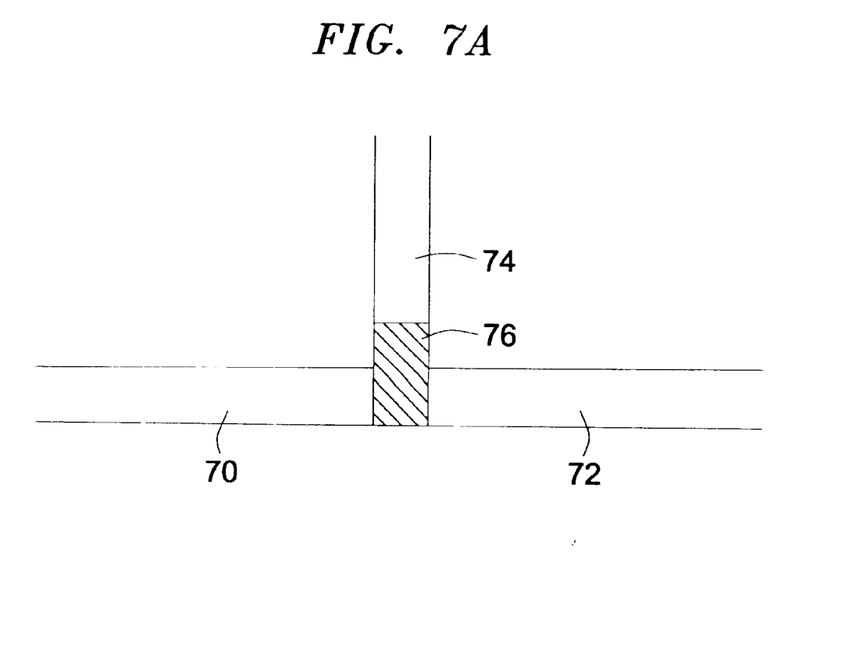
FIGS. 7A and 7B show operation of an exemplary valve for use with the invention.
Figure 7B:
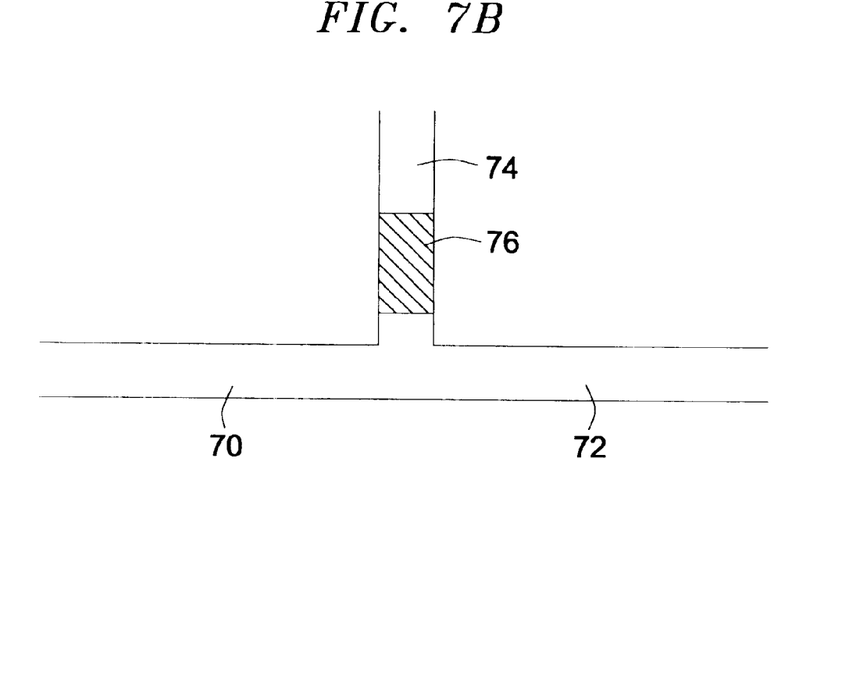

As shown in FIGS. 7A and 7B, a valve may be formed at a junction between three microchannels 70, 72 and 74 by placing a ferrofluid plug 76 at the junction as shown in FIG. 7A and moving the ferrofluid plug 76 with a magnetic drive (not shown) into one of the microchannels as shown in FIG. 7B and allow free fluid flow between the other microchannels.

Figure 8:
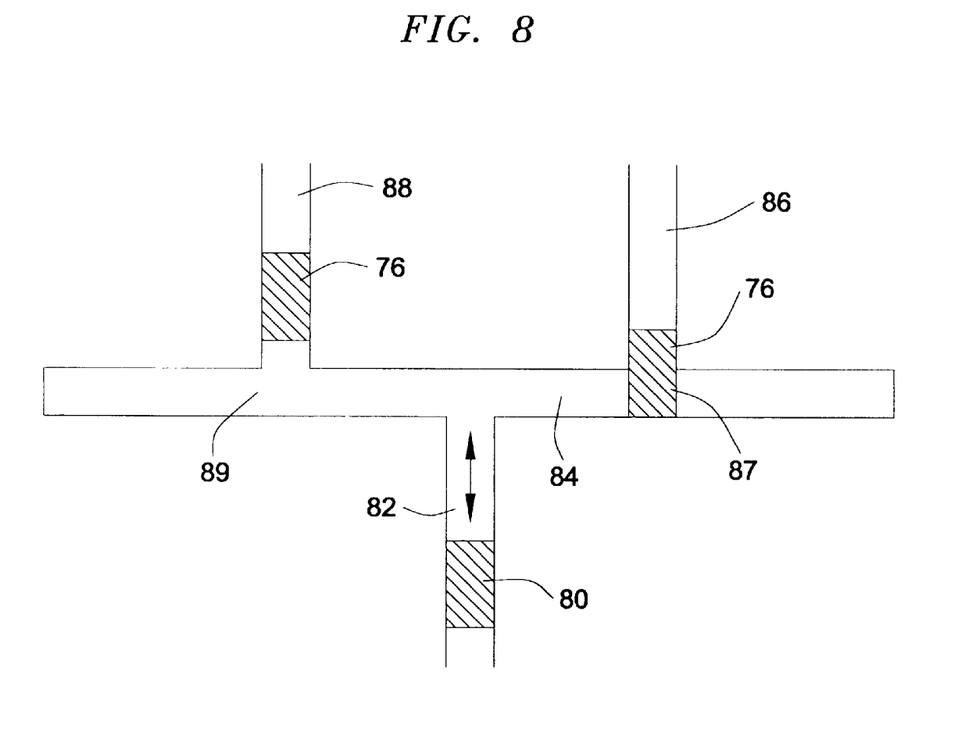
FIG. 8 shows an embodiment of the invention as applied to pumping with a reciprocal motion in a microchip.

Referring to FIG. 8, a drive fluid plug 80 may also be reciprocated to force fluid along a channel 82 in a microchip. Channel 82 intersects with channel 84, which has branch channels 86 and 88 connected with it at intersections 87 and 89, the channels 86 and 88 being located on either side of the intersection between channels 82 and 84. Ferrofluid plugs 76 operate as valves in the manner described in relation to FIGS. 7A and 7B. If the intersection 87 is open while plug 80 is moved towards channel 84, with intersection 89 closed, fluid in channel 84 will be moved in the direction from intersection 89 to 87 and thus pumped along the channel 84. If the intersection 89 is open while plug 80 is moved away from channel 84, with intersection 87 closed, fluid in channel 84 will be moved into channel 82 ready for pumping into channel 84 on the next pump stroke of plug 80.

Figure 8A:
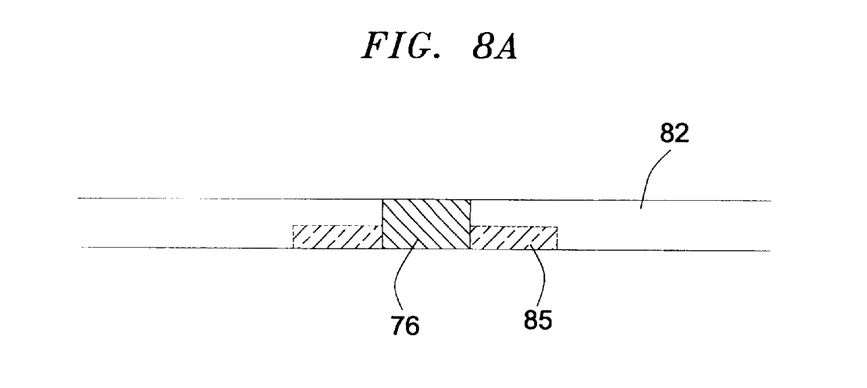
FIG. 8A shows how a plug may be stretched to provide differential pumping in opposite directions.

In a further example shown in FIG. 8A, a pump may be formed by moving the plug 76 in channel 82 in one direction, with the plug sealing the channel, and then expanding the plug 76 lengthwise along the channel as shown at 85, thus thinning it and unsealing it from the channel walls, so that on the return stroke, less fluid is driven.

Referring to FIGS. 9A–9E, embodiments of the invention in which drive fluid is recirculated around a loop channel that intersects with the flow channel are shown. The loop channel in each of FIGS. 9A–9E is shown as circular, but it may have any arbitrary shape that allows the drive fluid to be re-circulated.

Figure 9A:
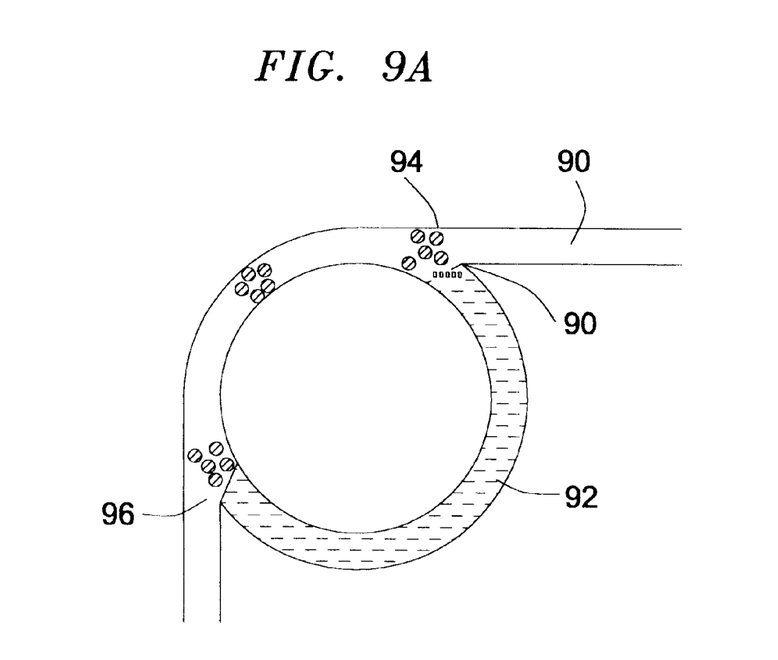
FIGS. 9A–9E show schematically embodiments of the invention in which drive fluid is recirculated around a recirculation channel.
Figure 10A:
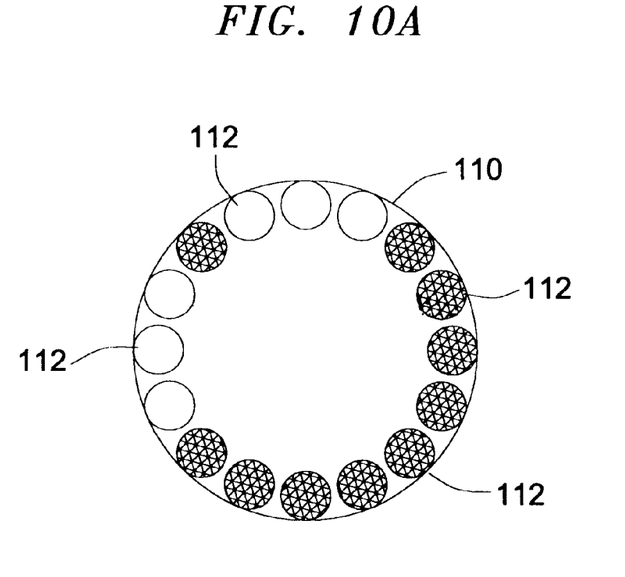
FIGS. 10A–10E show magnetic drives for the embodiments of FIGS. 9A–9E respectively, with FIG. 10F showing in addition a permanent magnet that forms part of the drive shown in FIG. 10E.

In FIG. 9A, main channel 90 carries the driven fluid. A loop channel 92 intersects with the channel 90 along a path between points 94 and 96. A magnetic drive 110 as shown in FIG. 10A has electromagnets 112 spaced around the circumference of the magnetic drive. A strongly magnetized electromagnet is indicated by the dark shading in each of FIGS. 10A–10E, and a weakly magnetized electromagnet is indicated by light shading. Each electromagnet may be energized and deenergized. In FIG. 9A, at the intersection 94 between the loop channel 92 and the main channel 90, a nozzle is formed by a series of obstructions 98 in the channel 92. Drive fluid fills the part of loop channel 92 that does not intersect with the channel 90. All the electromagnets 112 over the loop channel 92 are strongly magnetized. The electromagnets 112 that are situated over the channel 90 are initially weakly magnetized and when it is desired to pump are sequentially activated, with the first electromagnet 112 to be energized being the one over the region 94. This draws drive fluid from the drive fluid reservoir into the flow channel 90. As the electromagnets of the magnetic drive that are located over the flow channel 90 are sequentially activated, drops of drive fluid are forced between the obstructions 98 and moved along the main channel 90 from point 94 to 96, dragging driven fluid by frictional contact. The drive fluid is pulled by the sequential activation of the electromagnets in the magnetic drive into the loop channel 92 while the momentum of the driven fluid forces the driven fluid along the channel 90, tangentially to the channel 92. It is preferred to have strong magnetization in the loop channel 92 just beyond the point 96 to ensure recirculation of drive fluid around the loop channel 92.

Figure 9B:
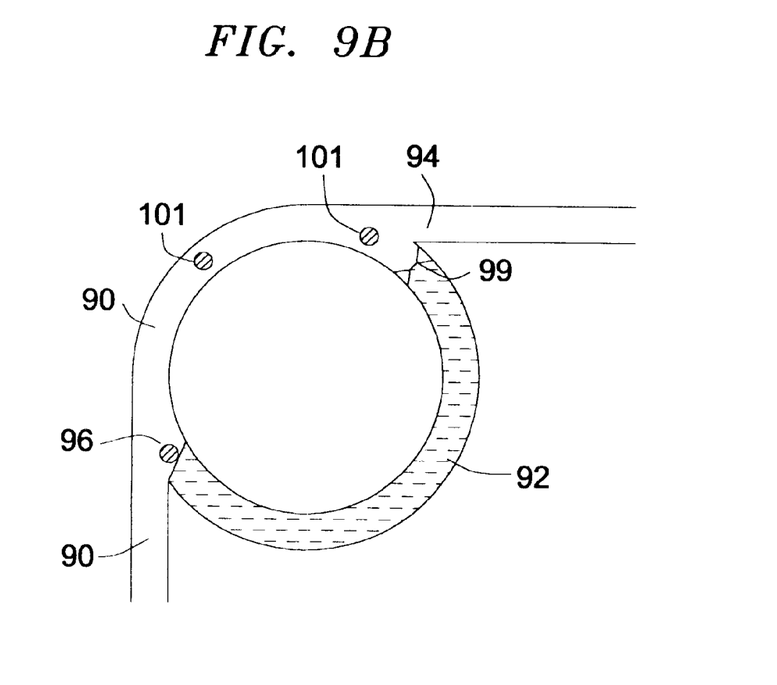
Figure 10B:
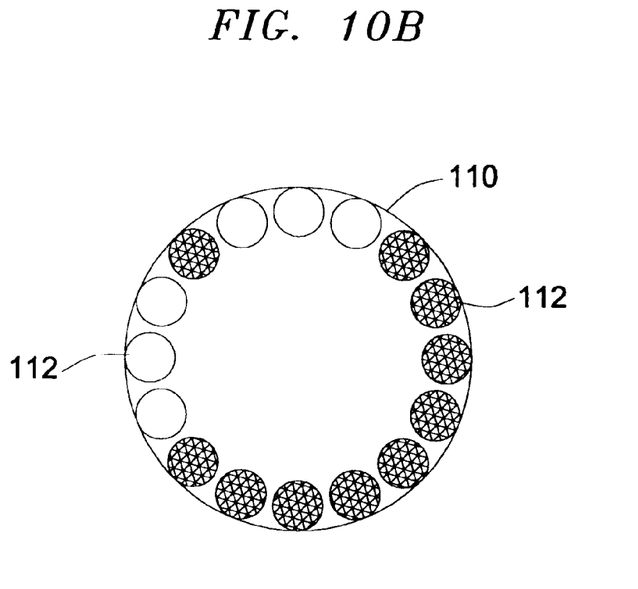

In FIG. 9B, a similar device to the device shown in FIG. 9A is shown, except the injector obstructions 98 are replaced by a restriction or nozzle 99, from which large fluid drops 101 are pulled by a localized strong magnetic field, moved along the channel 90 to point 96 and returned to the loop channel 92 for recirculation. The large drops have a size similar to the channel width. Again, the localized strong magnetic field is created by sequential activation of the electromagnets over the flow channel 90, as illustrated in FIG. 10B.

Figure 9C:
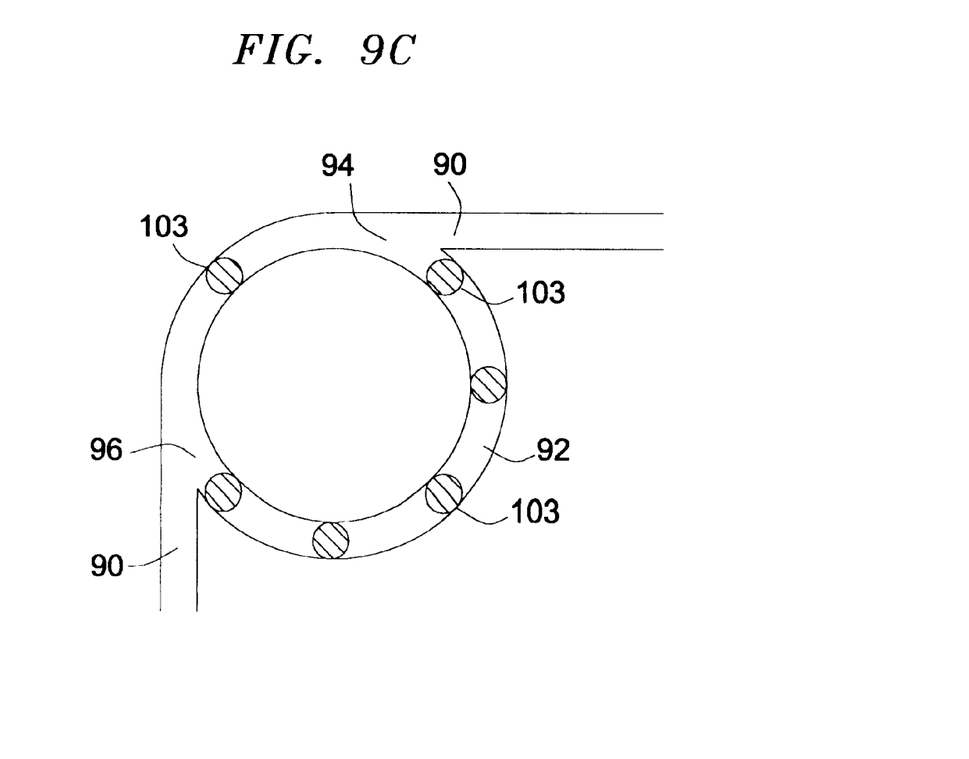
Figure 10C:
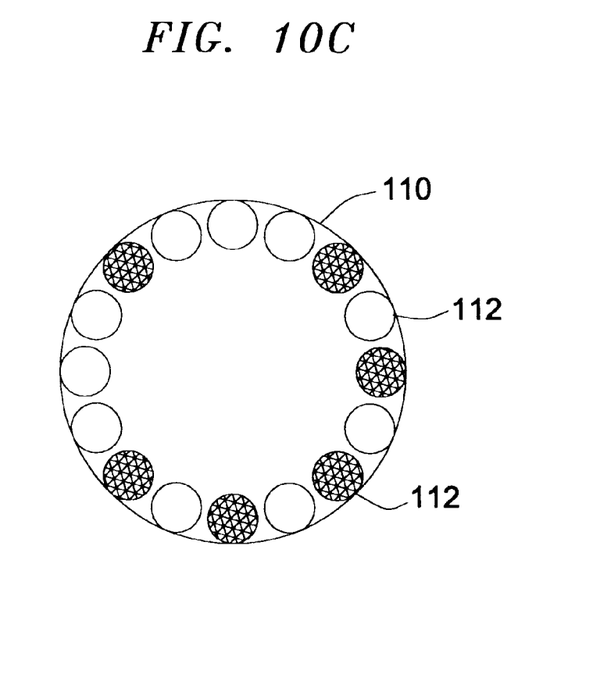
Figure 10D:
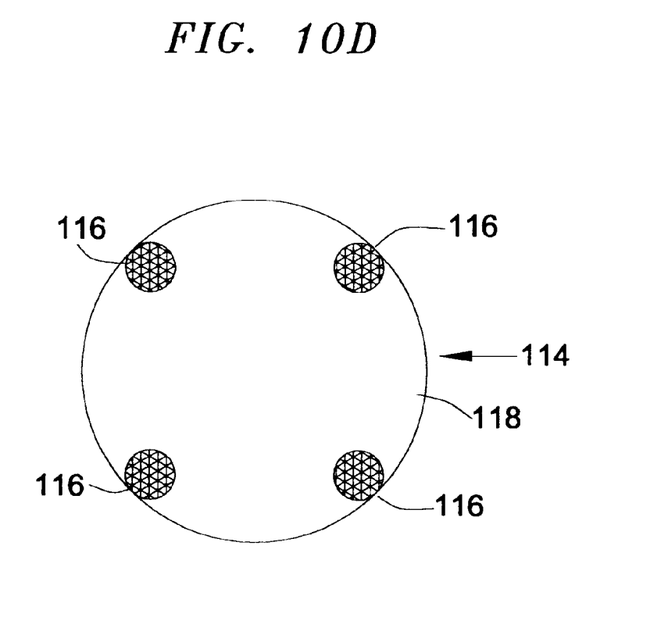
Figure 10E:
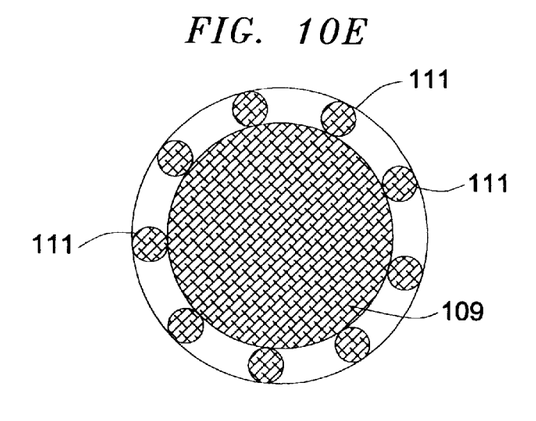
Figure 10F:
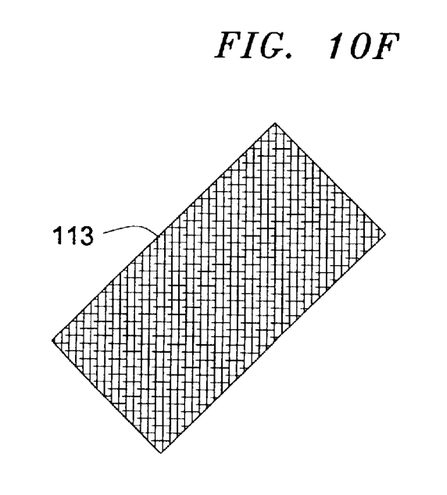

In FIG. 9C the same loop channel 92 and main channel 90 are used. However, fluid in the loop channel 92 is continuously moved around the loop channel as a series of segments 103 by several spaced locally strong magnetic fields. As shown in FIG. 10C, the magnetic drive is again a series of sequentially activated electromagnets 112. In this case, the electromagnets 112 are activated sequentially to attract the drive fluid and move it anticlockwise around the loop 92. Over the loop channel 92, the electromagnets may alternate in relative magnetic strength. Care must be taken to coordinate activations so that drive fluid does begin moving clockwise. Over the flow channel 90, the spacing between the activated electromagnets 112 is increased to create suction and pull more driven fluid along the flow channel 90 to be pumped.

Figure 9D:
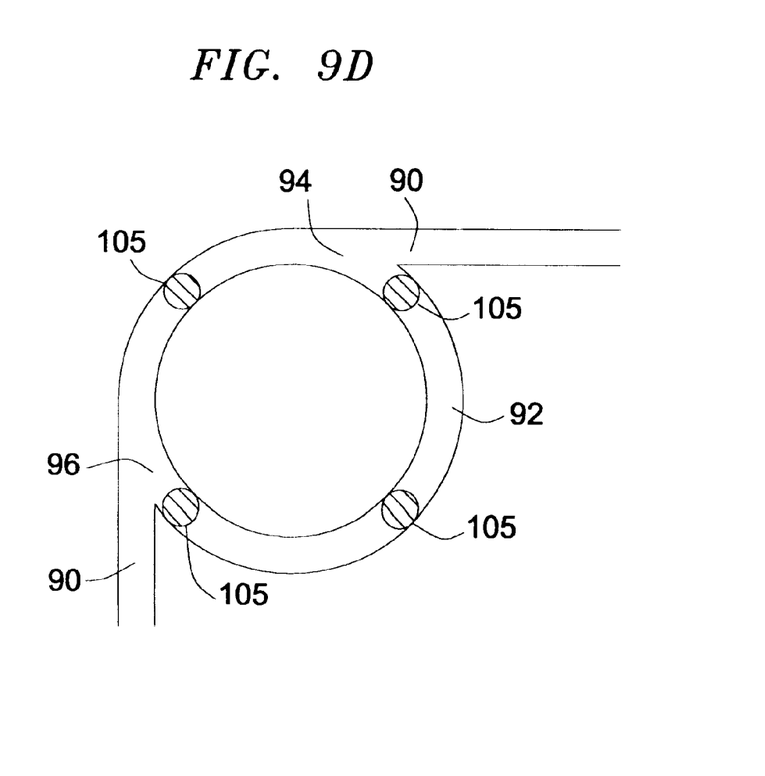

In FIG. 9D, the loop channel 92 and flow channel 90 are the same as in FIG. 9A. A magnetic drive 114 is formed by several magnets 116 mounted for rotation on a ring or disc 118 driven for example by a stepper motor (not shown in FIG. 9D). Four permanent magnets 116 may be used. Each electromagnet should be strongly magnetized. As the drive 114 rotates, drive fluid drops 105 are pulled around the loop channel 92 and through the flow channel 90 to drive driven fluid in the flow channel along the flow channel 90. In FIG. 9D, it is preferred that channel 90 be slightly wider than channel 92 to accommodate volume changes due to the pressure exerted by the drive fluid.

Figure 9E:
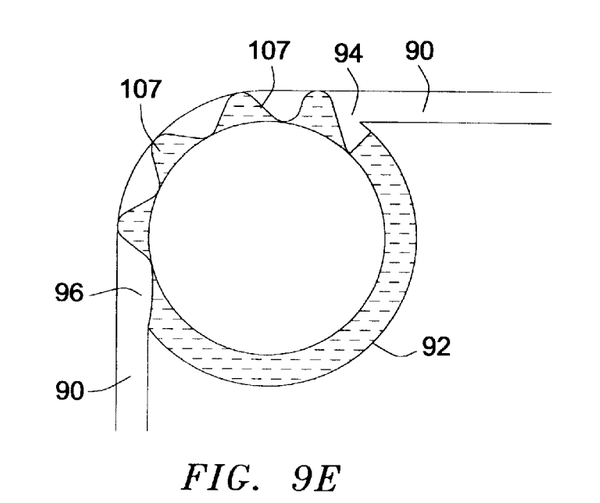

In FIG. 9E, loop channel 92 and main channel 90 are the same as shown in FIG. 9A. In this case, a strong ring shaped magnetic field is formed by a magnetic drive to shape the drive fluid into a ring on the inside of the loop channel 92 with multiple barriers or cogs 107 spaced around the loop channel 92. The cogs 107 may be continuous around the loop channel 92 or may be generated only in the flow channel 90. The magnetic drive in this instance is formed by a disc magnet 109 centered in the middle of the circle formed by the loop channel 92 and flow channel 90 with spaced satellite magnets 111 around the periphery of the disc magnet 109. To create a reservoir of drive fluid in the loop channel 92, a permanent magnet 113 may be placed over the loop channel 92. As the magnetic drive rotates (driven for example by a stepper motor), the cogs 107 drive driven fluid along the channel 90.

The magnets or electromagnets require an active field area commensurate with the size of the channel, but may be larger. For example, magnetic drivers for use with a microchip may be provided by coils with ferromagnetic cores having a diameter of in the order 100 $\mu$m. When the magnets are rotated, commercially available stepper motors may be used. The size of the apparatus outside the channels is not a factor in the operation of the pumps. A varying magnetic field may also be created in the channel by varying the distance of a permanent magnet from the channel.

In the embodiment of FIG. 1, several pockets could be formed in the driven fluid plug by several weak field areas in the magnet, but the more driven fluid that has to be moved in a single rotation, the more drive fluid has to be displaced. An additional reservoir to take drive fluid overflow may be required in this instance.

The pumps shown in FIGS. 1, 2 or 3 may be connected to a chamber having a small closeable opening at one end. The chamber may be evacuated with the pump to form a vacuum chamber, and samples may be drawn in through the opening for analysis within the chamber, such as by using a mass spectrometer.

A person skilled in the art could make immaterial modifications to the invention described in this patent document without departing from the essence of the invention that is intended to be covered by the scope of the claims that follow.

What is claimed is:

1. A micropump, comprising:

a microchip having a channel extending through the microchip, the channel having cross-sectional dimensions between 1 $\mu$m and 100 $\mu$m;

a drive fluid plug in the channel;

a driven fluid in the channel having an interface with the drive fluid plug in the channel; and a drive for the drive fluid mounted exterior to the microchip, the drive being configured to form a changing field that in operation may drive driven fluid along the channel by changing the location of the interface between the drive fluid plug and the driven fluid.

2. The micropump of claim 1 in which the drive fluid forming the drive fluid plug is a ferrofluid formed of a suspension of magnetic particles in a carrier liquid, and the drive is a magnetic drive.

3. The micropump of claim 1 in which the drive is configured to rotate drive fluid entirely around a loop formed in the channel.

4. The micropump of claim 2 in which the drive is configured to form cogs of drive fluid disposed around the loop in the channel.

5. The micropump of claim 1 in which the channel is formed in a base plate and covered by a cover plate.

6. A micropump, comprising:

a microchip formed of a base plate and a cover plate, a channel formed in the base plate that extends through the microchip with the cover covering the channel, the channel having cross-sectional dimensions between 1 $\mu$m and 100 $\mu$m;

a drive fluid plug in the channel, the drive fluid forming the drive fluid plug being a ferrofluid formed of a suspension of magnetic particles in a carrier liquid;

a driven fluid in the channel having an interface with the drive fluid plug in the channel; and a magnetic drive for the drive fluid mounted exterior to the microchip, the magnetic drive being configured to form a changing magnetic field that in operation may drive driven fluid along the channel by changing the location of the interface between the drive fluid plug and the driven fluid.

* * * * *

UNITED STATES PATENT AND TRADEMARK OFFICE
CERTIFICATE OF CORRECTION

PATENT NO.    : 6,318,970 B1
DATED         : November 20, 2001
INVENTOR(S)   : C.J. Backhouse It is certified that error appears in the above-identified patent and that said Letters Patent is hereby corrected as shown below:

<u>Column 7,</u>
Line 19, "claim 1" should read -- claim 2 --
Line 22, "claim 2" should read -- claim 3 --

<u>Column 8,</u>
Line 2, "and covered" should read -- and is covered --

Signed and Sealed this

Fourteenth Day of May, 2002

*Attest:*

JAMES E. ROGAN
*Attesting Officer*    *Director of the United States Patent and Trademark Office*